May 27, 1952 D. B. PARKINSON 2,597,898

AUTOMATIC IMPULSE SENDER

Filed June 29, 1948 3 Sheets-Sheet 1

INVENTOR
D. B. PARKINSON
BY William F. Simpson
ATTORNEY

May 27, 1952 D. B. PARKINSON 2,597,898

AUTOMATIC IMPULSE SENDER

Filed June 29, 1948 3 Sheets-Sheet 2

INVENTOR
D. B. PARKINSON
BY William F. Simpson.
ATTORNEY

May 27, 1952 D. B. PARKINSON 2,597,898

AUTOMATIC IMPULSE SENDER

Filed June 29, 1948 3 Sheets-Sheet 3

INVENTOR
D. B. PARKINSON
BY William F. Simpson.
ATTORNEY

Patented May 27, 1952 2,597,898

UNITED STATES PATENT OFFICE 2,597,898

AUTOMATIC IMPULSE SENDER

David B. Parkinson, Maplewood, N. J., assignor to Bell Telephone Laboratories, Incorporated, New York, N. Y., a corporation of New York Application June 29, 1948, Serial No. 35,930

16 Claims. (Cl. 179—90)

This invention relates to improved telephone calling and signaling methods, systems and apparatus which operate at a high rate of speed with greater accuracy and generate pulses and currents which are suitable for transmission over voice frequency channels and which are relatively inexpensive, rugged and simple and easy to use.

In the usual type of telephone calling and signaling system and the cooperating switching equipment in the prior art, the subscriber must select each digit of the number of the called station and move or operate some member of the dial or other calling equipment, and then this member is restored to normal during the transmission of the currents representing the magnitude of the digit or number and then each succeeding digit is selected and transmitted in a similar manner. Thus, the digits are selected and transmitted in sequence. No digit may be selected until the previous ones have been completely transmitted. Such an arrangement has a number of disadvantages. In the first place the time of setting up a call is largely limited by the speed of operation of the calling device and also by the time required for the subscriber to manipulate the device. Such arrangements require that expensive switching equipment be duplicated a number of times at switching points because it is held busy for relatively long periods of time on each call. Furthermore, the time required for a subscriber to transmit the call is increased by the time required for the transmission of these currents representing each of the digits after it has been selected by the subscriber. In other words, the subscriber has to direct his attention to calling and dialing, not only during the time required for the subscriber to manipulate the calling equipment or instrument, but also during the time it is transmitting the signaling currents. A further disadvantage of the above-described types of calling systems and devices is that the subscriber has no opportunity to check the accuracy of the number dialed. If he makes a mistake in setting any one of the digits, the complete number must be redialed.

An object of the present invention is to provide subscriber's calling and dialing equipment upon which the subscriber may set the entire number of the called subscriber prior to initiating a call. Such an arrangement enables the holding time of the equipment at the switching center which responds to the calling signals to be reduced because it does not need to be withheld during the time the subscriber manipulates the dial or other calling device. Such an arrangement also reduces the time and attention required on the part of the subscriber because the subscriber does not need to follow the transmission of each digit in sequence, but may set the entire number at one time on the instrument, then check its accuracy if it is so desired. As a result, the switching equipment at the central switching point is more effectively and efficiently used in establishing each call with the result that the cost of handling calls is materially reduced.

In the usual type of telephone signaling and calling equipment in the prior art, dial or calling pulses are transmitted from the subscriber station to the central switching station by means of interruptions of direct current and thus, over a direct current or extremely low frequency transmission channel. Pulses of this type cannot be transmitted over the usual voice frequency communication paths and will not be transmitted through the usual voice frequency repeaters, repeat coils, etc. It is, of course, possible to modulate the carrier current in accordance with these low frequency pulses, but such equipment is complicated, expensive and hard to maintain in proper working order and adjustment.

An object of the present invention is to provide an improved and simplified pulse generating equipment which is quiet in operation and of rugged construction and having a long life, for generating pulses suitable for transmission over the voice frequency communication paths or channels at a high rate of speed.

In the usual type of telephone calling and switching systems in the prior art, a large portion of the time required to set up a connection from the calling subscriber to the called subscriber, is consumed by the time required to transmit the low frequency pulses from a calling device.

An object of the present invention is to provide an improved pulse generating equipment for generating pulses at a high rate of speed capable of transmission over a voice frequency communication path so that the time required to transmit the information to the switching center and thus the time required to establish a connection from a calling to a called subscriber station is materially reduced whereby the efficiency of operation of the switching exchange is increased, thus decreasing the cost of establishing each call.

A feature of this invention relates to dialing and calling equipment for generating pulses in which the magnitude of each digit of the number dialed is represented by the time elapsing between a reference or start pulse and a stop or digit pulse. In an exemplary embodiment of this invention, both of these pulses are of short duration and of such character that they may be readily transmitted over a voice frequency communication path, and through the repeat coils, filter networks, amplifiers and other equipment forming parts of the voice frequency communication paths.

In the usual type of telephone signaling and calling equipment for use in telephone machine switching systems, the dial or calling pulses are transmitted to the central switching station or equipment but once, and if any error occurs in the transmission this one time a wrong number will result.

An object of the present invention is to provide calling and dialing equipment for transmitting calling signals to the central switching point which in its normal operation repeats the called number over and over again if so desired, thus permitting the number to be received a plurality of times at the switching station so that the number as received one time may be compared with the number as received another time to insure proper transmission and reception of the designation of the called station at the central switching station.

In the usual type of telephone switching system in the prior art it is customary to store the dialed number in an expensive and complicated equipment at the central office and then later whenever necessary cause the number either in whole or in part to be transmitted to another switching center and the above process repeated as often as required.

It is an object of the present invention to provide dialing equipment which may be located at the subscriber station which does not require such complicated switching and storing equipment at the central switching point. Instead, by generating pulses which may be transmitted over a voice frequency transmission path and repeating the entire number over and over again, it is possible to transmit the number from a subscriber station to each of the switching devices or switching stations necessary to extend the transmission path to the called subscriber station.

In transmitting pulses of short duration over voice frequency transmission paths, difficulty is frequently encountered due to transients set up by the pulses. These transients usually are decaying alternating currents which are produced by a mechanism similar to shock excitation of resonance circuits and arise from the resonance circuits encountered in transmission paths, repeat coils, filters and other transmission equipment. Transients resulting from the application of short pulses to such equipment frequently last a number of cycles and thus for an appreciable interval of time after the exciting pulse has been applied and terminated.

A feature of this invention relates to equipment to properly space the pulses so that ample time is allowed for the transients associated with or appearing incident to the application of each of the signaling pulses to the transmission system to die out sufficiently so that it will not interfere with the next signaling or calling pulse. In this manner it is possible to prevent interaction between the various pulses representing the digits of the number dialed so that the number may be correctly transmitted from the subscriber station and correctly received by the receiving equipment at the central switching station.

In a prior art, telephone subscriber stations have been designated by multinumeral or multidigit numbers or by combination of letters of the alphabet and numerals forming multielement code which is different for each subscriber station. Other switching systems have employed codes comprising a plurality of letters of the alphabet or other symbols. It is to be understood that any multielement designation may be employed to designate the various subscriber stations of the telephone switching system. In order to simplify the description the various elements of the designating code or identification of the subscriber station are called symbols or digits hereinafter. Furthermore, in order to avoid ambiguity, these elements are referred to as the digital position, and magnitude of the digit in each of the digital positions. If the elements are referred to as symbols, the symbols may occupy any one of a plurality of different positions and the symbols in any one of the positions may comprise any one of a plurality of different characters or have different magnitudes or other identifying characteristics.

In accordance with an exemplary embodiment of the present invention, a simple electromagnetic pulse generator is employed to generate the necessary signaling pulses. The pulse generator is provided with a number of permanent magnets mounted upon a rotatable shaft. The shaft is rotated by a motor of a suitable type so that the magnets pass various impulse coils at the proper or desired times. The position of various of the coils is alterable in accordance with the magnitude or value of the digit or number represented by the pulse generated in the respective coils. The magnets and coils are so arranged that one revolution of the shaft supporting the magnets causes all of the pulses necessary to represent any eight-digit number to be transmitted. That is, a number having eight different digital positions in which any digital character or magnitude from one to zero may occupy any one of the eight different digital positions of the complete number dialed.

In accordance with an exemplary embodiment of this invention, each of the pulses generated is of about 1.0 millisecond in duration. When pulses of this duration are transmitted over various types of voice frequency communication paths encountered in telephone systems they cause transient currents which persist for an appreciable time after a pulse is received. In an exemplary system about 3.5 milliseconds were required for the longest transients to die out sufficiently so that the succeeding pulse could be accurately recognized without interference from the transient caused by the previous pulse. In other words each transmitted pulse of approximately 1.0 millisecond duration is lengthened to a received pulse of current of approximately 3.5 milliseconds duration. At the end of this 3.5 milliseconds, a second pulse may be transmitted. If a first pulse is considered to be a start pulse and the second pulse a stop pulse, and if the second pulse may be transmitted at any one of ten different time intervals after the 3.5 milliseconds of time interval, any digit magnitude from 1 to 0 may be represented by two pulses. Thereafter, the next start pulse may not be transmitted for another interval of substantially 3.5 milliseconds, in the exemplary system mentioned above. In order to provide sufficient margins in the exemplary embodiment set forth herein 4 milliseconds are allowed for the transmission of each pulse and the times of the start of transmission assigned to stop pulses representing digits of successive magnitudes differ by a half millisecond.

Thus there is required an increment of time of 4 milliseconds for the transmission and reception of the start pulse, 9 increments of time of ½ millisecond each for the start of the transmission of a pulse in any one of the nine positions necessary to represent the various magnitudes of the digits, and a last increment of time of 4 milliseconds all of which will be needed for the second, or stop, pulse to be transmitted and its transients die away if it occurs in the 10th position. Consequently, 12½ milliseconds or 25 intervals of time elapse between the start pulses of succeeding digits, that is, it requires 12½ milliseconds in the exemplary system to transmit each digit of the number designating the called subscriber's station. The next start pulse will then be transmitted and the above-described manner of transmission of pulses repeated.

After the complete number has been transmitted it is desirable, in some manner, to indicate this fact and in the exemplary system set forth herein pulses of the complete number are set off by pauses in transmission. That is, by slightly longer intervals of time during which no pulses may be received. This increment of time must be longer than 17 increments of ½ millisecond normally encountered between the time of the transmission of the start pulse and a stop pulse representing zero, and may be any greater length of time desired. In the exemplary system set forth herein, this interval of time is between 25 and 50 increments of ½ millisecond each.

In order to generate the desired pulses, in accordance with an exemplary embodiment of the invention, a fixed start pulse coil together with eight movable stop pulse coils, one for each of the eight digital positions is provided. The stop pulse coils are adjustable in position so that the proper digital value for each of the digital positions of the called number may be independently selected by the subscriber. Eight magnets are mounted on the shaft adjacent the start pulse coil and will cause eight different and uniformly spaced start pulses to be generated within this coil during each revolution of the shaft. A single magnet is also mounted upon the shaft adjacent each of the stop pulse coils and causes a single pulse to be generated in the respective stop pulse coil for each complete rotation of the shaft carrying the magnets. The shaft carrying the magnets is driven from any suitable motor or mechanism which in an exemplary embodiment of this invention takes the form of a synchronous electrical motor which is capable of being operated by low frequency current transmitted over the subscriber's lines or derived from some other source at or adjacent to the subscriber station. By causing the motor to be continuously operated during the dialing operation, the complete number is continuously dialed over and over again so that it will be available to actuate any suitable type of switching equipment necessary to complete the call.

The windings of all of the coils are connected to the transmission circuit capable of transmitting voice frequency currents which circuit extends to a central switching point where the pulses may be employed to control switching circuits for extending the transmission path to the called subscriber either directly or through other switching stations or exchanges.

The foregoing objects and features of this invention the novel features of which are set forth in the claims appended hereto may be more readily understood in my reference to the attached drawings in which:

Figure 3:
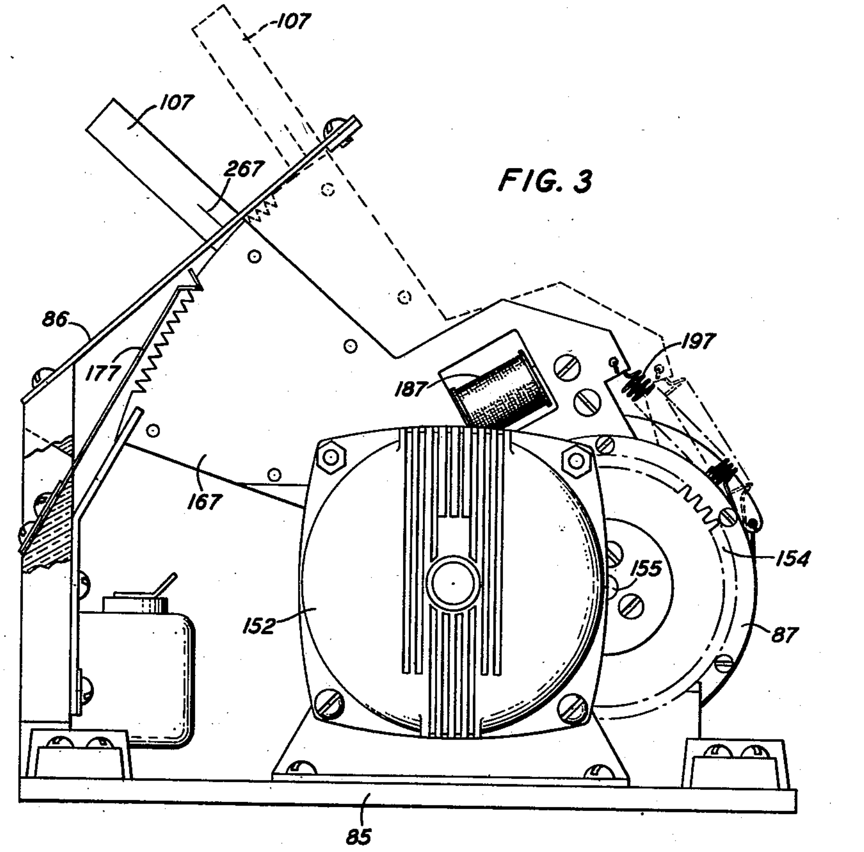
Fig. 3 is an end view of an exemplary subscriber's dialing equipment embodying the present invention.

The manner in which the dial equipment shown in the drawings may be incorporated in a complete telephone switching system providing the necessary supervisory and signaling features as well as the necessary voice frequency transmission and reception equipment is disclosed and the novel features thereof are claimed in an application of Malthaner Serial No. 35,925, filed on or about June 29, 1948. Suitable types of equipment for responding to the dial and signaling pulses transmitted from the equipment disclosed in the drawings forming an exemplary embodiment of the present invention are disclosed and the novel features thereof are claimed in the copending applications of Vaughan Serial No. 35,911 and Malthaner-Newby-Vaughan Serial No. 35,924 both filed on or about June 29, 1948.

Figure 1:
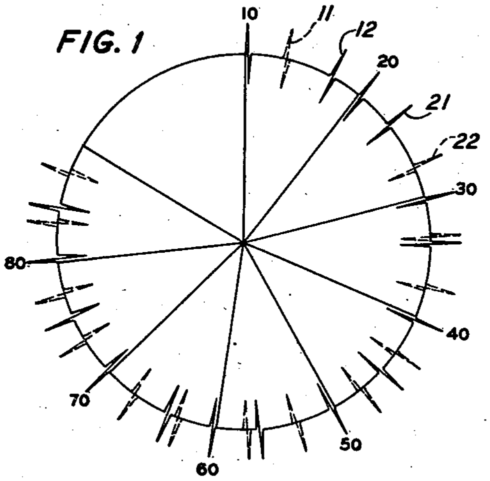
Fig. 1 illustrates the pulses transmitted to represent a number and their possible times of transmission in an exemplary embodiment of the invention.

Referring now to Fig. 1 a number of pulses are represented around the periphery of the circle. The number of pulses shown in this figure is suitable for the transmission of an eight-digit number. As shown in Fig. 1 the circle is divided into eight equal parts and an additional longer segment; each of the eight equal parts is employed to represent the positions of the symbols of the code representing the called station. The ninth and longer segment of the circle is provided to enable the various digital positions of the number to be properly represented and distinguished one from another. In other words this long interval is provided to indicate the starting point of the transmission of the number or code of the called station.

It is indicated in Fig. 1 that a start pulse, 10, is transmitted at the beginning of the first digital position and a similar start pulse designated 20, 30, 40, 50, 60, 70 and 80 is transmitted at the beginning of each of the succeeding intervals assigned to the succeeding digits of the number.

As indicated above, no pulses are transmitted for a certain interval following the start pulse 10, 20, etc., in order to permit any transients due to the start pulse to decay sufficiently so they will not interfere with the succeeding pulses.

After an interval of time equal to approximately eight unit increments of time as pointed out above, these transients will have died out so that it is possible to transmit the stop pulse in the position or time represented by the dotted pulse 11, Fig. 1. Such a pulse would represent the digit 1 of the first position in the complete number dialed. As assumed herein a pulse is not transmitted at this time. Instead a pulse is transmitted nine increments of time later in the zero or tenth position as represented by the solid pulse 12. As illustrated in Fig. 1, this pulse is transmitted in the tenth or zero position thus representing a zero for the first digit of the number dialed. It will be readily understood that this pulse may occupy any one of ten different positions 1 to 0. Positions 1 and 0 are represented by the dotted line 11 and solid pulse line 12, respectively. It is also apparent that the first pulses or digits of the number or code of the called subscriber may represent a letter or letters or both instead of a number. The first two or three series of pulses frequently represent letters of a telephone office code. Herein these pulses are assumed to represent numbers but may represent letters of the alphabet or other symbols when desired.

Following the transmission of the stop pulse 12 it is necessary to allow any transient setup thereby to decay for an interval of time approximately equal to eight increments as pointed out above. This interval of time is illustrated in Fig. 1 by the interval between the stop pulse 12 and the start pulse 20 of the succeeding digit. The stop pulse of the next digit is represented by the solid line 21 which is in the first possible position, thus indicating that the second digit of the number is 1. The dotted line 22 represents the position of the stop pulse if the second digit is another zero. In each of the succeeding digit intervals a start pulse is represented by a solid line. In addition a solid line stop pulse is also represented together with dotted pulses in the first and zero positions, thus indicating the range of times during which the stop pulse may be transmitted as required by the magnitude of the digit in the respective positions. It should be noted that the last two pulses may represent the station letter of the called party on a party line as is well understood in the telephone art.

After the eighth stop pulse has been transmitted, the rest interval or pause indicated by the ninth segment of the circle of Fig. 1 is provided. This long interval during which no pulses are transmitted allows the various digital positions to be recognized, enabling the receiving equipment to properly respond to the number and recognize the digits and their position in the number.

Figure 2:
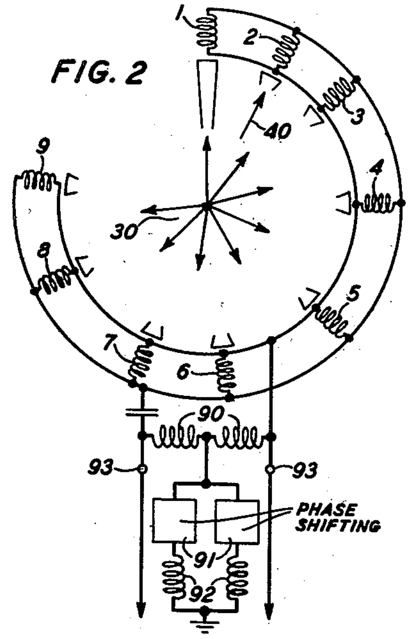
Fig. 2 shows the manner in which the various coils and motors and other equipment is interconnected to cooperate one with another and with the subscriber's line extending to the central switching station.

As pointed out hereinbefore, the stop pulses are generated within stop coils located around the periphery of a group of rotating magnets. These coils are positioned in accordance with the magnitude of the respective digits to be transmitted. These coils are represented by the windings as shown in Fig. 2. The coil positions shown in Fig. 2 are roughly in accordance with the position of the stop pulses represented in Fig. 1. It is to be understood, however, that these coils may be positioned in any of the various positions required to properly represent the desired numbers by means of the pulses induced in these stop coils. The various magnets are also represented in Fig. 2 by arrows heads. The magnets which cooperate with the start coil are represented by the arrow heads 30. Inasmuch as eight start pulses are generated, eight magnets are represented in Fig. 2; one for generating each start pulse. While a similar magnet is provided for cooperating with each stop pulse coil all of the magnets are represented in Fig. 2 by the single arrow head 40.

As indicated in Fig. 2 coils are all connected in parallel and in turn connected to the subscriber line 93 extending to the central switching station. As pointed out above, in the exemplary embodiment of this invention the magnet structure is rotated past the pick-up coils 1 through 9 by means of an electric motor which may be synchronously operated. By employing an alternating current synchronous motor operated by the two-phase or split-phase windings 92, it is possible to generate the pulses in accurate time positions so that they may be readily recognized and properly recorded in the central switching station. In order to obtain the power for operating the motor, circuits are arranged as shown in Fig. 2 to receive single phase alternating current over the subscriber's line. This power supply circuit is frequently called a simplex circuit as arranged in Fig. 2. That is, the alternating current is applied between the two line conductors in parallel, and ground. The simplex coil 90 provided at the subscriber stations presents a high impedance to the signaling pulses or currents generated by the pick-up coils but permits the power supply alternating current to pass through them to the phase splitting or phase shifting networks 91 and the two phase windings 92 of the driving motor. In this manner it is possible to transmit the power required to operate the motor over the subscriber's line.

If, however, as shown in the above-identified Malthaner-Newby-Vaughan case, it is desired to supply the power for operating the motor locally, this may also be readily accomplished as will readily be understood by persons skilled in the art.

The details of the driving motor and pulse generating equipment are shown in Figs. 3, 4, 5 and 6 where the same number has been employed to represent the same elements in the various figures of the drawing.

The pulse generation unit is provided with a base 85 of any suitable material on which the driving motor 152 is mounted. The driving motor 152 in the exemplary embodiment described herein is an alternating current motor operated from a two-phase alternating current system. Such motors are well known and need no further description. As indicated in Fig. 2 the two-phase current may be derived from a single phase current by proper phase shifting or phase splitting networks.

The motor 152 is arranged to drive the generator shaft 155 through gears 153 and 154. The generator shaft 155 is rotatably supported on the base 85.

Figure 6:
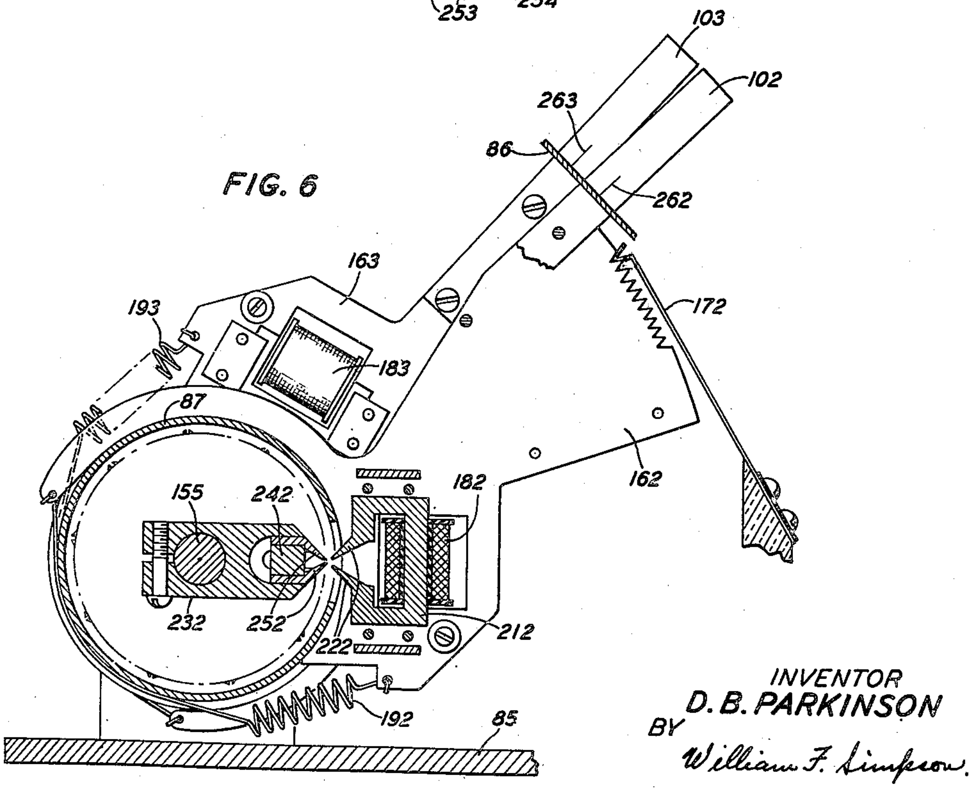
Fig. 6 shows a section taken along the section line 6—6 of Fig. 4.

Drum 87 is fixedly mounted on the base 85 concentric with the shaft 155. Drum 87 is provided with a group of nine slots, in the exemplary embodiment described herein, one slot being provided for supporting the start coil and each of the other eight slots being provided for supporting the stop coil associated with each of the eight digital positions of the number to be dialed. It is, of course, apparent that any suitable number of slots may be provided, one being provided for the start coil and one for each digital position of the number to be dialed or represented by the pulse generating equipment. Each of the slots is provided with an opening as illustrated in Fig. 6 through which the pole-pieces of each of the coil cores such as 222 extend as will be described hereinafter.

The terminal blocks 150 and 151, as well as other miscellaneous equipment, are also mounted on base 85. In addition, a number and guide plate 86 is also supported in any suitable manner upon base 85.

In the exemplary embodiment set forth herein in detail, nine impulse coil supporting members 161 through 169, inclusive, are provided for supporting the nine impulse coils 181 to 189, inclusive. Each of these coil supporting members is provided with a semicircular cut-out portion for engaging the slots on drum 87 as described above. Each of these members is held in engagement with the stationary drum 87 and in its respective slot by means of the respective springs 191 to 199, inclusive. Eight of the coil supporting members 161 through 168, inclusive, are provided with hand levers 101 to 108 to enable the position of the coils to be readily adjusted around the periphery of the drum 87. The hand levers 101 through 108 extend through slots in the number plate 86 and carry index marks 261 to 268, inclusive; index marks 262 and 263 are shown in Fig. 6. The coil supporting members 161 through 169 are provided with a group of notches which cooperate with an associated detent 171 through 178, inclusive. The detent and notches are provided so that the coil supporting members will remain in any one of the ten different positions 1 to 0 in which they are positioned. The index marks 261 through 268 cooperate with the numbers on the number plate 86 so that the subscriber may readily set the hand levers and thus the coils in any desired position in accordance with the number to be dialed.

As indicated above, each of the coil supporting plates 161 through 169 is provided with a coil 181 to 189. These coils are provided with the respective cores 211 through 219. Each of the cores has a pair of pole-pieces 222 which extend through the fixed drum 87.

Figure 4:
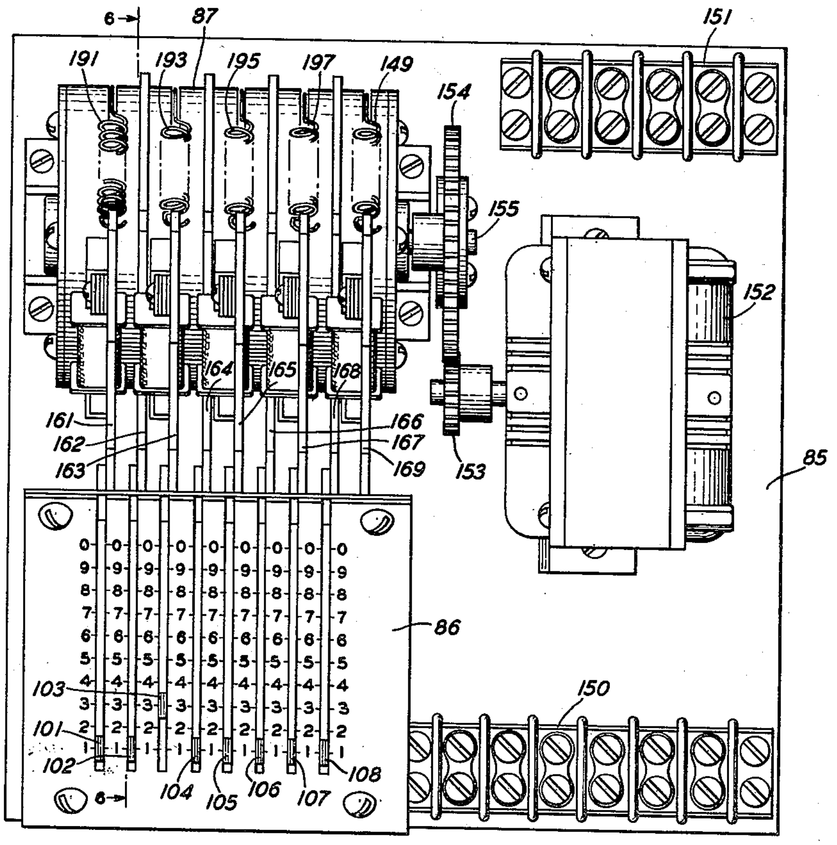
Fig. 4 is a plan or top view of the same equipment.

All of the various coils, coil supporting members, and other cooperating members are not shown in all of the figures. They are indicated, however, in Fig. 4. Fig. 3, for example, shows merely one coil supporting member 167 supporting coil 187 together with its adjusting lever 107. As illustrated in Fig. 3, the adjusting lever and thus the coil may be moved in any position intermediate between the positions illustrated by the solid lines and the position illustrated by the dotted lines including the two positions shown by the dotted and solid lines in Fig. 3. The other coils, of course, are similarly adjusted between any two similar positions. By means of the detent arrangement, described above, such as 177 shown in Fig. 3 and 172 in Fig. 6, the lever and thus the coil and supporting members will assume any one of ten different positions. Fig. 6 shows one coil supporting member 162 in full, supported upon the drum 87. Coil 183 together with its supporting member 163 and hand lever 103, is shown located behind the coil 182 and its corresponding supporting plate or member 162. As shown in Fig. 4, the coil supporting members are arranged alternately so that one group of the coil supporting members will be positioned as illustrated by 162 and the other group by the members as illustrated by member 163.

Figure 5:
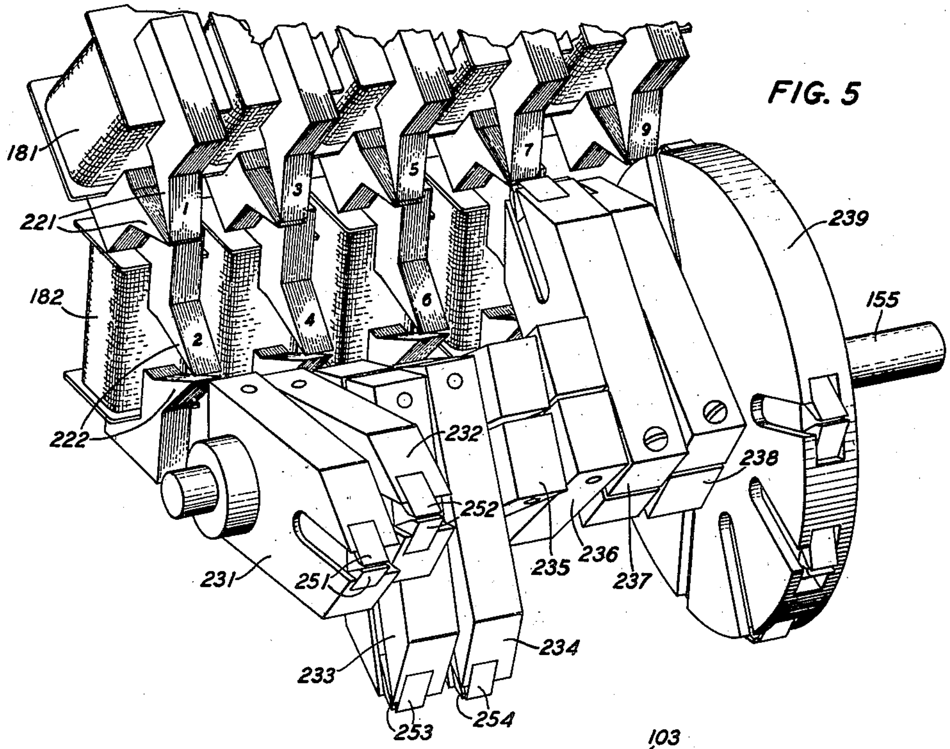
Fig. 5 shows a perspective of the various coils and magnets and the manner in which they are mounted adjacent one another to generate the pulses, in accordance with the present invention.

Fig. 5 shows a perspective of the arrangement of the coils, cores and pole-pieces as well as the manner in which the cooperating magnets and pole-pieces are mounted on a shaft 155 so that they may be rotated past the respective coils, cores and pole-pieces. As illustrated more clearly in Figs. 5 and 6, there is associated with each of the coils a magnet supporting member 231 through 238 which members are mounted upon shaft 155 so that they will rotate with this shaft. Each of these members carries a permanent magnet such as 242 shown in Fig. 6, together with a pair of pole-pieces 251 through 258, inclusive. These pole-pieces are arranged to cooperate with the pole-pieces such as 222 of the respective coils such as 182. Thus when the pole-pieces 252 are rotated past the pole-pieces 222 by shaft 155 under control of the motor 152 a pulse current is generated within the winding of the respective coil.

A ninth magnet supporting structure 239 is mounted upon the shaft 155 adjacent the start pulse coil 189. The member 239 is provided with eight magnets similar to magnet 242 and eight pairs of pole-pieces. These magnets and pole-pieces are located around the periphery of the member 239 at substantially the angular positions illustrated in Fig. 1 by the various start pulses 10 through 80, inclusive. Consequently, as the shaft 155 rotates the eight magnets past the start coil, eight uniformly spaced start pulses are generated within this coil and transmitted over the line. Likewise, each time one of the other magnets such as 252 is rotated past the pole-pieces of its related pick-up coil a pulse is generated in this coil.

It will be apparent to a person skilled in the art that the various pick-up coils may be located at various positions around the drum 87 and arranged to be adjusted manually to the proper position to secure the generation of appropriate pulses in each of the respective coils. In this case all of the magnets and their related supporting structure, except the magnets cooperating with the start coil, would be lined up in substantially the same radial position. However, such an arrangement would require each or many of the coil supporting members to be different and would be rather cumbersome and bulky. In order to reduce the size, improve the design and to permit various parts to be standardized, the coils are lined up in two rows as shown in Fig. 4 and alternate coil supporting members turned oppositely thus permitting the coils to be located more closely adjacent one another to provide a more compact pulse generator. With the coils so arranged it is necessary to position the various magnet structures substantially in the manner shown in Fig. 5, in order to generate the pulses at the desired time as described above with reference to Figs. 1 and 2.

In using the equipment the subscriber will first position the hand levers 101 to 108 so that the respective index marks 261 through 268, inclusive, coincide with the various digits or symbols of the number to be dialed; that is, the number of the called subscriber's line or station. It is to be noted that the subscriber has this number before him at all times so he may readily check the number of the called station before he places the call, during the call and afterwards, by observing the setting of the hand levers 101 through 108. The subscriber will then place the call by operating appropriate other mechanisms such as lifting the receiver or handset or operating any desired keys or switches. Motor 152 will either be continuously operating or be set into operation by a subscriber initiating or placing a call in any suitable manner.

Motor 152 in operating will continuously rotate the respective permanent magnets and related structures past the various impulse coils which will in turn cause pulses to be generated in these coils in the manner described above. As these magnets are rotated they cause start pulses such as illustrated in Fig. 1 by pulses 10 through 80 to be generated and also associated stop pulses in any one of the ten positions depending upon the position of the respective hand levers 101 through 108 in the manner described above. Inasmuch as the motor is continuously rotating it will cause pulses representing the number of the called subscriber station to be continuously repeated and transmitted over the line.

These pulses are transmitted over the subscriber's line 93 to a central switching station where they are received and recorded by equipment such as disclosed in applications of Vaughan Serial No. 35,911 and Malthaner-Newby-Vaughan Serial No. 35,924 which applications are filed on an even date herewith, and made a part hereof as if fully included herein. At the completion of the setting up of a path to a called subscriber's line the circuits of the subscriber's station and central office will operate in a manner similar to that set forth in patent application of Malthaner, Serial No. 35,925, also filed on an even date herewith, which circuits function to disconnect the pulse generating equipment from the line and connect the subscriber's telephone circuit to the line. In addition, the motor may be stopped at this time if it is so desired. At the completion of the call the subscriber will return his equipment to normal so that he may make another call by properly positioning the hand levers as described above and thereafter placing a call in any suitable manner.

It should be noted that the subscriber has before him at all times during the placing of the call and during the call if he so desires, the number of the called station so that he may readily check whether he has called the proper number. It is also apparent that the only action required on the part of the subscriber is to set the hand levers and that the equipment thereafter automatically and repeatedly transmits pulses representing the desired number as long as necessary so that these pulses will be available to any switching equipment to which the subscriber's line may be extended.

What is claimed is:

1. In a telephone system, calling apparatus comprising means for generating two pulses for each symbol representing a called station comprising an electric motor, a shaft driven by said motor, a plurality of impulse coils located adjacent to the shaft, means for varying the positions of a plurality of said impulse coils around said shaft in accordance with the symbols designating the called station, and means supported on said shaft for inducing a voltage in said coils for each revolution of said shaft.

2. A telephone calling apparatus comprising a rotatable shaft, apparatus for rotating said shaft at substantially constant speed, a plurality of coils located adjacent said shaft, means for individually varying the position of each of a plurality of said coils relative to said shaft, and instrumentalities controlled by said shaft for inducing a voltage pulse in each of said coils at least once during every revolution of said shaft.

3. A telephone calling system comprising means for generating two pulses only for each of a plurality of symbols of a called station code, and apparatus for varying the time elapsing between said two pulses to represent different symbols of the codes of called stations, and means for repeatedly generating said pulses representing said codes.

4. A telephone calling system comprising apparatus for generating a first series of regularly recurring pulses for each symbol of a subscriber's code, apparatus for generating another series of recurring pulses interleaved with the pulses of said first series also having a pulse for each symbol of the code of the called station, apparatus for independently varying the time of generation of each of the pulses of said second series relative to the respective pulses of said first series.

5. A telephone calling system comprising apparatus for generating a first series of regularly occurring pulses for each symbol of a subscriber's code, apparatus for generating another series of pulses also having a pulse for each symbol of the code of the called station, apparatus for independently varying the time of generation of each of the pulses of said second series relative to the respective pulse of said first series, and apparatus for repeating each of said series of pulses after a predetermined interval of time.

6. In a telephone calling system, a calling line, a member for each symbol position of a called station code, means for setting said member in any one of a plurality of different positions, apparatus for generating a pulse under control of the setting of each of said members, and other apparatus for generating a reference pulse having a predetermined time relation to said pulses generated under control of said members, and pulse transmission paths for conveying said pulses to said line.

7. A telephone calling system comprising a continuously operating pulse generator for generating repeated series of regularly recurring pulses including means for transmitting a predetermined signal between each series of pulses having a longer time interval than the time interval between any pulse and the next succeeding pulse of each of the individual series of pulses, means for repeatedly generating variably timed pulses between said regularly spaced pulses, and apparatus for controlling the time of generation of said variably timed pulses in accordance with the symbols of calling station code.

8. In a telephone calling arrangement, apparatus for transmitting a start pulse for each symbol of a called station code, apparatus for transmitting a stop pulse following each of said start pulses, and means for varying the time elapsing between each start pulse and the following stop pulse apparatus for automatically repeating said pulses after an interval of time longer than the time elapsing between any of said start pulses and following stop pulses.

9. A telephone calling system comprising apparatus for repeatedly generating a first series of regularly occurring pulses having a pulse for each symbol representing the code of a called station, apparatus for repeatedly generating another series of pulses interspersed with the pulses of said first series also having a pulse for each symbol of the code of the called station, means for independently controlling the time of generation of each of the pulses of said second series relative to the time of occurrence of the respective pulses of said first series.

10. In a telephone calling system apparatus for generating reference pulses, a plurality of settable members, means for independently setting each of said members in any one of a plurality of positions, and apparatus for repeatedly generating a series of pulses one pulse of each series being generated at any one of a plurality of different times relative to the time of occurrence of a reference pulse which time is selected by the position of a respective one of said settable members.

11. A telephone calling arrangement comprising a voice frequency transmission path, apparatus connectable to said path for repeatedly generating pulses representing a designation of a called station in which said pulses have frequency components located within voice frequency transmission band, means for controlling the transmission of said pulses at intervals of time greater than a predetermined interval to permit the dissipation of transients induced in said path incident to the transmission of said pulses, and means for further controlling the time of transmission of predetermined ones of said pulses in accordance with the identity of the called station.

12. A telephone calling device in combination means for repeatedly generating a series of signaling pulses each pulse being of short duration having frequency components located within a voice frequency transmission band, a telephone voice frequency transmission path connectable thereto, control apparatus for said generator to control the time of generation of said pulses of each series of pulses in accordance with the designation of a called station and apparatus including a time interval determining device for spacing each series of pulses representing the called station by time intervals longer than the time interval between any of the successive pulses of any of said series of pulses.

13. In a telephone signaling system, signaling apparatus comprising a pulse generator for generating pulses of short duration having frequency components located within a voice frequency telephone transmission path, a voice frequency transmission path, means for connecting said path to said generator, said generator comprising a start coil and a plurality of stop coils, means for producing a magnetic field, apparatus for moving said magnetic field past each of said coils and means for individually varying the time at which said magnetic field is moved past each of a plurality of said stop coils in accordance with the designation of the called station.

14. A telephone calling device comprising a plurality of impulse coils, means for producing a magnetic field, apparatus for moving said magnetic field past one of said coils at a plurality of regularly recurring intervals of time, followed by a longer interval of time for inducing in said coil pulses having frequency components lying within the frequency range of a voice frequency transmission path, means for producing other magnetic fields, apparatus for moving said other magnetic fields past others of said coils for inducing therein similar pulses, and means for varying the time at which said fields are moved past said other coils.

15. A telephone calling device comprising a plurality of impulse coils, means for producing a magnetic field, apparatus for moving said magnetic field past one of said coils at a plurality of regularly recurring intervals of time, followed by a longer interval of time for inducing in said coil pulses having frequency components lying within a voice frequency transmission path, means for producing other magnetic fields, apparatus for moving said other magnetic fields past others of said coils for inducing therein similar pulses.

16. In a telephone system in combination a multisymbol code calling device comprising means for generating two pulses for each symbol representing a called code, a telephone subscriber's line extendible to said device, connecting apparatus for conveying said generated pulses to said line, an electric motor, connecting means for connecting said motor to said subscriber's line, a shaft driven by said motor, a plurality of impulse coils located adjacent said shaft, means for varying the positions of a plurality of said impulse coils around said shaft in accordance with the symbols of a called code and means supported on said shaft for inducing voltages in said coils for each revolution of said shaft.

DAVID B. PARKINSON.

REFERENCES CITED

The following references are of record in the file of this patent:

UNITED STATES PATENTS

| Number | Name | Date |
|---|---|---|
| 548,406 | Thomson | Oct. 22, 1895 |
| 2,060,244 | Roe | Nov. 10, 1936 |
| 2,199,443 | Ott | May 7, 1940 |
| 2,253,650 | Richard | Aug. 26, 1941 |
| 2,452,547 | Chatterjea | Nov. 2, 1948 |